May 21, 1940.  C. A. BUCHEN  2,201,224
CONCRETE CART
Filed Jan. 25, 1939  2 Sheets-Sheet 1
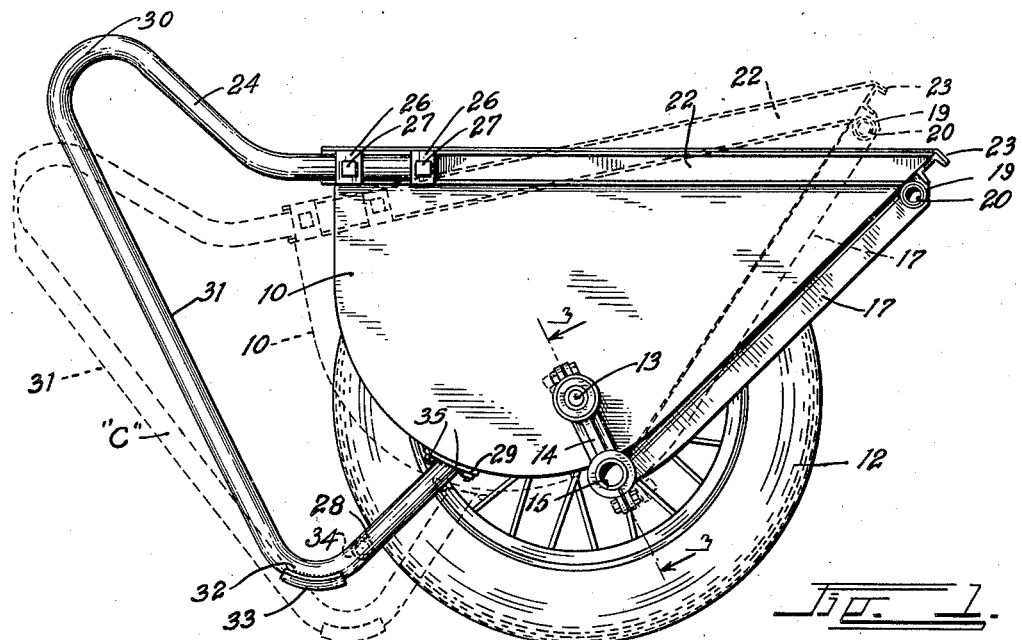
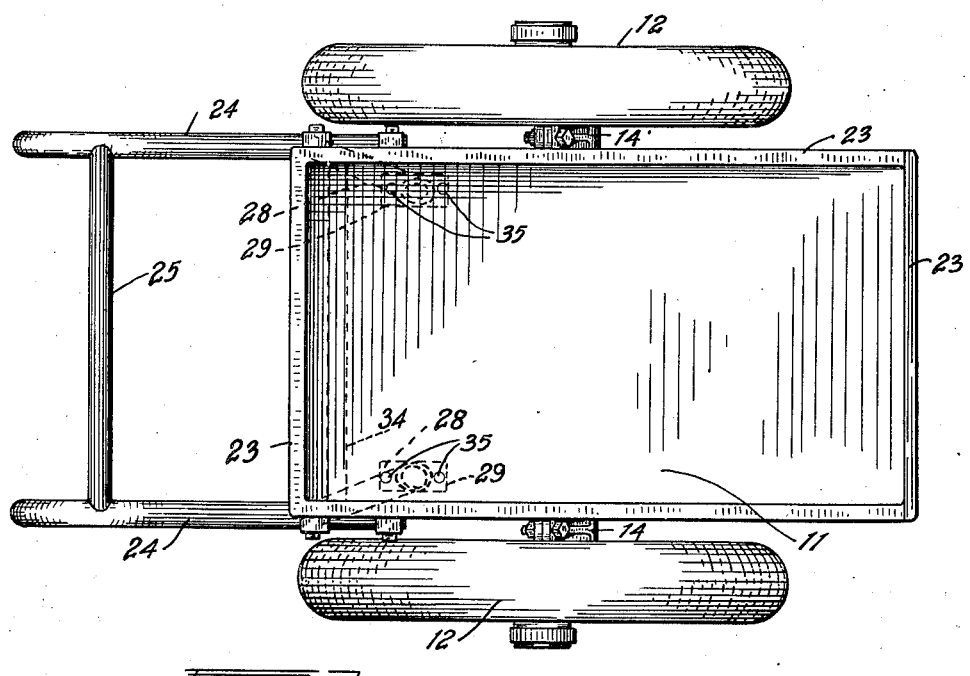
INVENTOR.
C. A. BUCHEN
BY
ATTORNEY.

May 21, 1940.   C. A. BUCHEN   2,201,224
CONCRETE CART
Filed Jan. 25, 1939   2 Sheets-Sheet 2
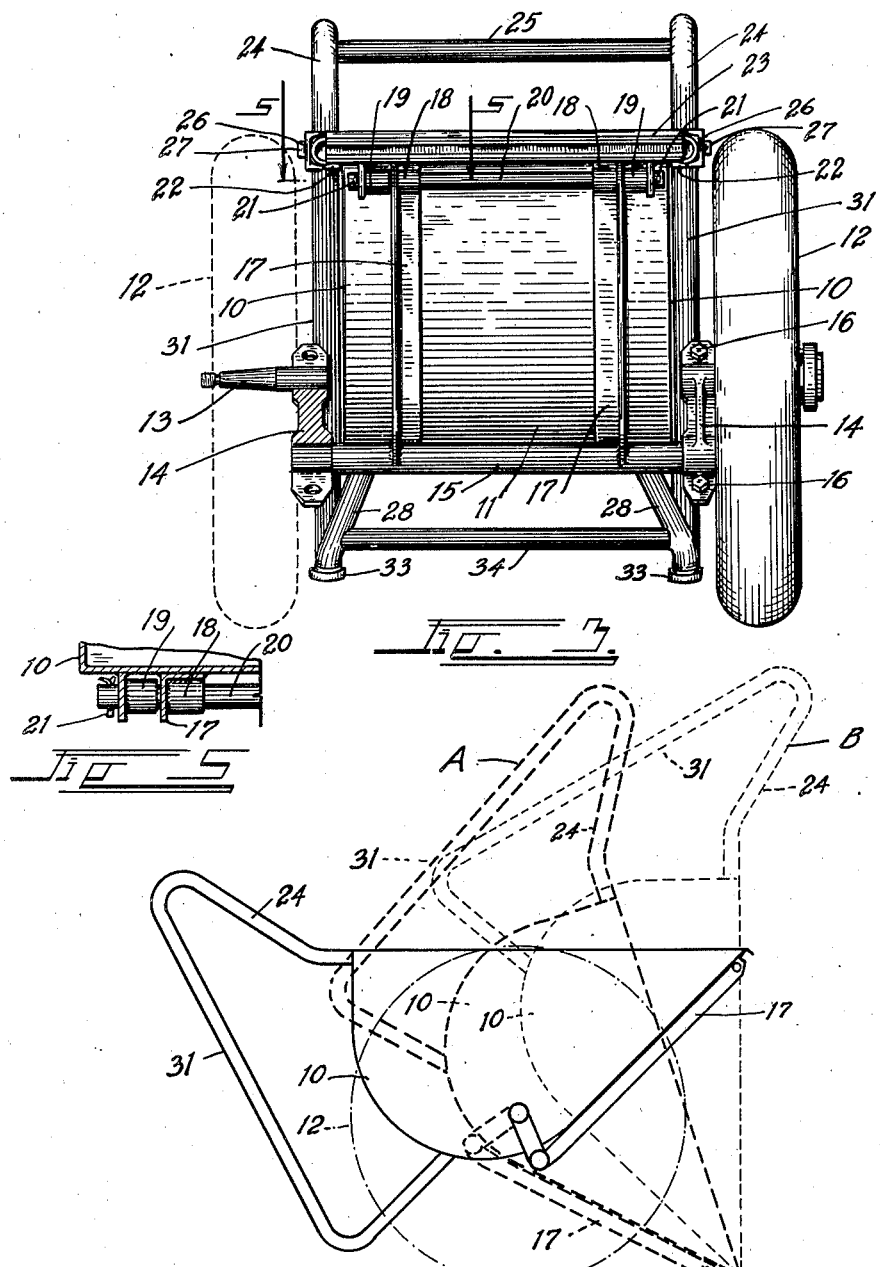
INVENTOR.
C. A. BUCHEN
BY
ATTORNEY.

Patented May 21, 1940

2,201,224

UNITED STATES PATENT OFFICE 2,201,224

CONCRETE CART

Clement A. Buchen, Denver, Colo., assignor to Eaton Metal Products Co., Denver, Colo.

Application January 25, 1939, Serial No. 252,752

4 Claims. (Cl. 298—2)

This invention relates to a two-wheeled barrow or cart, more particularly of the type known as a concrete "buggy" for use in transporting wet concrete and has for its principal object the provision of a highly efficient construction by means of which the cart can be quickly and easily loaded at the mixer and quickly, cleanly and easily dumped at the point of application.

Another object is to provide a construction which can support extremely heavy loads with a minimum of structural weight.

Other objects reside in the detail construction of the invention, which is designed for simplicity, economy, and efficiency, and other advantages resulting therefrom. These will become more apparent from the following description.

In the following detailed description of the invention reference is had to the accompanying drawings, which form a part hereof. Like numerals refer to like parts in all views of the drawings and throughout the description.

In the drawings:

Fig. 1 is a side elevation of the improved wheeled cart with the near wheel removed. In this view the "at rest" position is shown in broken lines.

Fig. 2 is a plan view of the improved cart.

Fig. 3 is a front view thereof with the left wheel removed. In this view the wheel hanger is shown in section, the section being taken on the line 3—3, Fig. 1.

Fig. 4 is a diagrammatical view illustrating typical positions during the dumping operation.

Fig. 5 is a detail section through the body hinge members, taken on the line 5—5, Fig. 3.

The improved truck comprises a scoop-shaped sheet metal body having vertical flat sides 10 joined by means of a curved bottom 11 which extends downwardly and forwardly to form an inclined front plate on an angle of substantially 45°. The upper edge of the body is reinforced throughout by means of a channel band 22 which extends completely around the top thereof. The upper edge of the body metal is flanged outwardly over this channel as shown at 23.

The body is supported upon suitable wheels 12 which are preferably of the rubber tired variety. The wheels 12 are mounted on stub axles 13 extending from wheel hangers 14. The hangers 14, when the truck is in the transporting position of Fig. 1, extend downwardly and slightly forward to a cross bar 15 upon which the body rests and which supports the body and its load. The extremities of the hangers contain split openings for receiving the stub axles 13 and the bar 15. These openings are clamped about the members by means of suitable clamp bolts 16.

A pair of inclined frame members or angle bars 17 are permanently welded at their lower extremities to the tubular cross member 15. A tubular bearing sleeve 18 is welded to each of the angle bars adjacent its upper extremity and a similar tubular bearing sleeve 19 is welded to the forward face of the body 10 at each side of each angle member 17. A hinge bar 20 extends through all of the bearing sleeves 18 and 19 and is held in place therein by means of suitable cotter keys 21 through its extremities.

A pair of tubular handle members 24 project rearwardly from the body member and are connected together by means of an upper cross handle bar 25 and a lower cross bar 34. The handle members 24 are secured in any desired manner at their upper extremities to the peripheral channel 22. As illustrated, they are clamped in clamping members 26 by means of suitable clamp bolts 27. The lower extremities of the handle members are turned inwardly as shown in broken line at 28 and welded to straps 29 which are in turn bolted to the bottom of the body 10 by means of bolts 35.

Each handle member extends rearwardly and upwardly from the clamping members 26 to form a hand loop 30 thence extends downwardly and forwardly to form straight slide portions 31. The portions 31 are turned upwardly at their bottoms to form foot portions 32 and are then extended forwardly and upwardly to the straps 29. The foot portions may be reinforced against wear by means of curved foot plates 33.

When the cart is being wheeled to location, it is in the position of Fig. 1, with the operator supporting the rearward extremity by means of the hand loops 30. When in this position, the center of gravity of the load is slightly to the rear of the wheel axles 13 so that the load is almost balanced with very little weight on the handles, with the body resting on the tubular cross member 15 and the member 17.

When the dumping position is reached, the operator lifts on the handles until he swings the wheel axles forwardly over the supporting cross bar 15. This places the center of gravity forward of the wheel axles and causes the forward end of the body to tip downwardly. Its downward tip is controlled by the operator in allowing his hands to slide downwardly along the hand slides 31. The body finally comes to rest in the broken line position A of Fig. 4. To still further dump the contents, the operator now pushes the handle members forwardly allowing his hands to slide to the foot loops 32. This causes the body to swing forwardly over the hinge bar 20, the wheels remaining on the ground, to the second broken line position B of Fig. 4 to discharge the remainder of the contents. The body is then let back to the tubular cross bar 15 and the entire body and frame are tilted back to the position of Fig. 1.

When resting on its feet 32, as shown in broken line at C, Fig. 1, the center of gravity of the body and its load is still further to the rear of the wheel axles due to the rearward swing of the body so that the weight is evenly divided between the two foot members 32 and the two wheels 12 to provide a stable support and eliminate accidental over-turning.

The frame members 17 act as a reinforcement for the inclined front of the body when the latter is in the transportation position, and support the load thereon to prevent bending or bulging.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A wheeled cart comprising: a cross frame member; a hanger extending upwardly from each extremity of said cross frame member; a stub axle extending outward from the upper extremity of each hanger; a wheel mounted on each axle; frame members secured to said cross frame member and extending forwardly and upwardly therefrom; a scoop-shaped body hinged to the upper forward extremities of the frame members and resting on said cross frame member; a hinge bar supported between the upper extremities of said frame members; and means for hinging the forward upper portion of said body on said hinge bar.

2. A wheeled cart comprising: a cross frame member; a hanger extending upwardly from each extremity of said cross frame member; a stub axle extending outward from the upper extremity of each hanger; a wheel mounted on each axle; frame members secured to said cross frame member and extending forwardly and upwardly therefrom; a scoop-shaped body hinged to the upper forward extremities of the frame members and resting on said cross frame member; a pair of tubular handles, each secured at its upper extremity to the upper rear of said cart and inclining first rearwardly and upwardly thence forwardly and downwardly to form an elevated handle loop, the forward and downward portions being straight to form a hand slide and terminating at its bottom in a forwardly and upwardly turned extremity to form a supporting foot.

3. A wheeled cart comprising: a pair of wheels; an axle frame extending between said wheels; inclined frame members extending forwardly and upwardly from said axle frame; a scoop-shaped body supported by said axle frame; an inclined front plate in said body; and hinge means between the upper extremities of said inclined members and the upper edge of said plate so that when said axle frame is tilted to place the extremities of said frame members on the ground, said body can be tilted on the ground engaging extremities as a fulcrum.

4. A wheeled cart comprising: a pair of wheels; an axle frame extending between said wheels; inclined frame members extending forwardly and upwardly from said axle frame; a scoop-shaped body supported by said axle frame; an inclined front plate in said body contacting said inclined frame members throughout their lengths, said members acting as stiffeners for said plate; and hinge means between the upper extremities of said inclined frame members and the upper edge of said plate so that when said axle frame is tilted to place the extremities of said frame members on the ground, said body can be tilted on the ground engaging extremities as a fulcrum.

CLEMENT A. BUCHEN.